Patented Sept. 4, 1934

1,972,568

UNITED STATES PATENT OFFICE 1,972,568

METHOD OF PRODUCING PHENYLSTEARIC ACID

Ralph H. McKee, New York, and Henry B. Faber, Brooklyn, N. Y.

No Drawing. Application June 30, 1932, Serial No. 620,300

3 Claims. (Cl. 260—108)

The present invention relates to a method of producing phenylstearic acid.

Heretofore various methods have been proposed for the production of phenylstearic acid. The most pertinent of these prior references have been described in the Journal of the American Chemical Society, vol. 49, page 1103 (1927) and vol. 52, page 1172 (1930). It is well known that the prior attempts to produce phenylstearic acid, particularly on a practical and industrial scale, have involved certain disadvantages and shortcomings, and particularly involved relatively low yields of about 35%. One of the most serious objections to prior processes was that they were not operable on a plant or factory scale due to the fact that it was practically impossible to control the course of the chemical reactions involved. Although attempts have been made to provide a wholly satisfactory process which avoided the disadvantages and shortcomings of the prior art and particularly one which provided larger yields, no process, as far as we are aware, has been proposed which fulfills the requirements of the situation.

It is an object of the present invention to provide a process for producing phenylstearic acid, which can be carried out on a practical and industrial scale and which is capable of producing relatively high yields.

It is the further object of the invention to provide a process which avoids the shortcomings and disadvantages of the prior art and which is satisfactory and economic when conducted on a practical scale.

It is also within the contemplation of the invention to provide a process which is carefully controlled and which produces a crude phenylstearic acid with an undistillable residue of less than about 5%, with a higher quality and with less expense than prior methods.

Other objects and advantages of the invention will become apparent from the following description of a preferred procedure of carrying the invention into practice.

About 350 parts of oleic acid are added to about 600 parts to about 900 parts of benzol. It is essential that the oleic acid and the benzol should be entirely dry. The oleic acid may be desiccated by heating or by other methods, while it is preferred to dry the benzol by bringing it in contact with granular calcium chloride. In carrying out the foregoing operation care should be taken to see that the apparatus used is entirely dry. To the dry benzol solution of the oleic acid about 165 parts to about 200 parts of aluminum chloride (generally 180 parts) are gradually added. It has been found that aluminum chloride reacts readily with the moisture of the air and it is preferred to cover the aluminum chloride with dry benzol, say 100 parts, in order to protect the same and to feed the aluminum chloride in this wet but anhydrous condition into the hot benzol solution of the oleic acid.

Before the addition of the aluminum chloride it is preferred to heat the benzol solution of oleic acid to approximately the boiling point of benzol. In practice, it has been found that a temperature range of about 78° C. to about 80° C. gives the most satisfactory results. Throughout the addition of aluminum chloride, the temperature is carefully controlled.

The reaction of aluminum chloride with benzol and oleic acid causes the evolution of chlorine in the form of hydrogen chloride, usually about ⅓ of the chlorine in aluminum chloride is evolved as hydrogen chloride. It is preferred to absorb the hydrogen chloride in water and to use the HCl solution thus produced in subsequent operations of the process. It is to be observed that when water absorption of HCl is employed, the set up for this operation must preclude the back diffusion of water vapor into the reaction vessel.

Upon completion of the reaction the entire mass is poured into dilute acid, which is subjected to more or less constant stirring. It is preferred to use the dilute hydrochloric acid which has been produced in preceding operations of the process. By thus running the mass into dilute hydrochloric acid the aluminum compound, which is present, is decomposed with the formation of an aqueous solution of aluminum chloride. The aqueous solution is separated from the remaining benzol solution of phenylstearic acid.

The separated phenylstearic acid is preferably washed several times with water. After washing, the benzol solution of phenylstearic acid is filtered to remove any suspended matter and the bulk of the benzol is removed in any appropriate manner, such as by distilling with steam. The remaining mass is crude phenylstearic acid, which is then purified by spraying into a heated vessel that is at a temperature of about 165° C. and which is under a good vacuum. In the heated vessel residual water, benzol and any low boiling constituents are rapidly removed by the combined effect of the vacuum and heat but without injury to the remaining primary product. It has been found that a rapid removal of residual water and benzol apparently stabilizes the product.

After the removal of the residual water, benzol and low boiling constituents, the crude phenylstearic acid is drawn off and is found to have a weight corresponding to approximately 85% of the theoretical weight based upon the amount of oleic acid used. The crude phenylstearic acid is a clear yellow-brown, fluorescent oil, having an iodine number of approximately 11. Vacuum distillation tests show that the crude phenylstearic acid made by the new method has an undistillable residue of only about 5% of its weight and the distillate is substantially free from any fraction showing solid fatty acids. It is to be noted that products made by the process hitherto used had undistillable residues of more than 40%.

Although the present invention has been described with particular reference to certain reagents, temperatures, etc., it is to be understood that variations and modifications may be made which are within the purview of this invention as defined in the appended claims as those skilled in the art will readily understand.

What is claimed is:

1. The improvement in the process of producing phenylstearic acid which comprises dissolving about 350 parts of anhydrous oleic acid in about 600 to about 900 parts of anhydrous benzol to form an anhydrous benzol solution of oleic acid, heating said anhydrous solution to a temperature within a range of about 78° C. to about 80° C., gradually adding to said heated anhydrous benzol solution about 180 to about 200 parts of anhydrous aluminum chloride wetted with anhydrous benzol, and maintaining the said anhydrous solution in a controlled heated condition.

2. The process of producing phenylstearic acid which comprises forming an anydrous solution of oleic acide in benzol, gradually adding aluminum chloride in an anhydrous condition to said anhydrous benzol solution of oleic acid, maintaining the said anhydrous solution in a controlled heated condition, mixing the benzol solution with an aqueous solution of dilute hydrochloric acid upon completion of the reaction of aluminum chloride, benzol and oleic acid to form phenylstearic acid, separating the aqueous solution from the benzol solution containing phenylstearic acid, washing the separated phenylstearic acid with water, filtering the benzol solution to remove suspended matter, removing the bulk of the benzol by steam distillation to yield crude phenylstearic acid, purifying said crude phenylstearic acid to remove residual water, benzol and low boiling constituents by spraying into a heated vessel at a temperature of about 165° C. and under a good vacuum to produce purified phenylstearic acid.

3. The process of producing phenylstearic acid which comprises dissolving about 350 parts of oleic acid in about 600 to about 900 parts of benzol to form an anhydrous benzol solution of oleic acid, heating said anhydrous solution to a temperature within a range of about 78° C. to about 80° C., gradually adding to said heated anhydrous benzol solution about 180 to about 200 parts of anhydrous aluminum chloride, maintaining the said anhydrous solution in a controlled heated condition, mixing the benzol solution with an aqueous solution of dilute acid upon completion of the reaction of aluminum chloride, benzol and oleic acid to form phenylstearic acid, separating the aqueous solution from the benzol solution containing phenylstearic acid, washing the separated phenylstearic acid with water, filtering the benzol solution to remove suspended matter, removing the bulk of the benzol by steam distillation to yield crude phenylstearic acid, purifying said crude phenylstearic acid to remove residual water, benzol and low boiling constitutents by spraying into a heated vessel at a temperature of about 165° C. and under a good vacuum to produce purified phenylstearic acid.

RALPH H. McKEE.
HENRY B. FABER.